United States Patent
Ellis et al.

[11] Patent Number: 5,928,971
[45] Date of Patent: Jul. 27, 1999

[54] FIREFIGHTER'S GARMENT

[75] Inventors: W. Douglas Ellis, Atlanta; Denise N. Statham, Sharpsburg; Gregory Alexander, Senoia, all of Ga.

[73] Assignee: Southern Mills, Inc., Union City, Ga.

[21] Appl. No.: 08/792,294

[22] Filed: Jan. 31, 1997

Related U.S. Application Data

[60] Provisional application No. 60/011,017, Feb. 1, 1996.

[51] Int. Cl.$^6$ .................................................... B32B 7/00
[52] U.S. Cl. ........................... 442/76; 442/118; 442/208; 442/209; 442/240; 442/244
[58] Field of Search ............................ 442/76, 118, 136, 442/208, 209, 240, 244

[56] References Cited

U.S. PATENT DOCUMENTS

| | | | |
|---|---|---|---|
| 3,710,395 | 1/1973 | Spano et al. | 2/78 |
| 4,034,417 | 7/1977 | Ellis | 2/81 |
| 4,039,709 | 8/1977 | Newman | 428/159 |
| 4,451,934 | 6/1984 | Gioello | 2/113 |
| 4,502,153 | 3/1985 | Lapedes et al. | 2/81 |
| 4,604,759 | 8/1986 | Bowman et al. | 2/81 |
| 4,709,421 | 12/1987 | Grilliot et al. | 2/81 |
| 4,748,691 | 6/1988 | Grilliot et al. | 2/81 |
| 4,830,897 | 5/1989 | Lichtenstein | 428/90 |
| 4,843,646 | 7/1989 | Grilliot et al. | 2/69 |
| 4,897,886 | 2/1990 | Grilliot et al. | 2/81 |
| 5,001,781 | 3/1991 | Grilliot et al. | 2/69 |
| 5,001,783 | 3/1991 | Grilliot et al. | 2/81 |
| 5,031,242 | 7/1991 | Aldridge et al. | 2/81 |
| 5,131,097 | 7/1992 | Grilliot et al. | 2/81 |
| 5,150,476 | 9/1992 | Statham et al. | 2/93 |
| 5,236,769 | 8/1993 | Paire | 428/196 |
| 5,362,555 | 11/1994 | Lai | 442/118 |
| 5,539,928 | 7/1996 | Aldridge | 2/93 |

*Primary Examiner*—James J. Bell
*Attorney, Agent, or Firm*—Thomas, Kayden, Horstemeyer & Risley

[57] ABSTRACT

A face cloth for a thermal barrier of a firefighter's garment made from a fabric woven from fire resistant yarns. The yarns are woven into a twill pattern with, preferably, filament yarns in the filling direction and spun yarns in the warp direction and a finish is applied to the fabric. The finish is accepted by the fabric and renders the face cloth both wickable and hook-and-loop compatible. The face cloth has a smooth and slick surface and is wickable and hook-and-loop fastener compatible.

22 Claims, 1 Drawing Sheet

FIREFIGHTER'S GARMENT

This application claims priority from U.S. Provisional Patent Application Ser. No. 60/011,017, filed Feb. 1, 1996.

FIELD OF THE INVENTION

The invention relates generally to a firefighters' garment. More specifically, the invention relates to the face cloth of a thermal barrier lining placed inside a firefighter's garment that makes the garment more comfortable and fire protectant.

BACKGROUND OF THE INVENTION

For firefighters working on the fireground, the most obvious concern for personal safety is protection against burn injury. Firefighters' turnout gear, which typically consists of matching coat and pants, is designed primarily to prevent the wearer from sustaining a serious burn. The National Fire Protection Association (NFPA) publishes a minimum performance standard for firefighters' turnout gear. This standard is recognized industry-wide as the overall guideline for identifying the minimum level of performance for turnout gear and the fabrics from which they are constructed. For any gear to be labelled compliant with NFPA 1971, the fabrics in that gear must be subjected to many stringent tests, most related to flammability.

NFPA compliant turnout gear or garments are comprised of three layers: an outer shell, an intermediate moisture barrier, and a thermal barrier lining. The outer shell is usually a woven fabric made from flame resistant fibers such as an aramid such as those sold under the trademarks NOMEX® and KEVLAR® by Dupont. The outer shell is considered a firefighter's first line of defense. Not only should it resist flame, but it needs to be tough and durable so as not to be torn, abraded, or snagged during normal firefighting activities.

The moisture barrier, while also flame resistant, is present to keep water from coming in and saturating the turnout gear. Excess moisture entering the gear from the outside would laden the firefighter with extra weight and increase his or her load. A suitable moisture barrier is a layer of GORE-TEX® material on a substrate of NOMEX®.

The thermal barrier is flame resistant and offers the bulk of the thermal protection afforded by the ensemble. A traditional thermal barrier is a batting made of a nonwoven fabric of flame resistant fibers quilted to a lightweight woven face cloth also made of flame resistant fibers. The batting may be either a single layer of needle-punch nonwoven fabric or multiple layers of spun lace nonwoven fabric. The face cloth is commonly quilted to the batting in a cross-over or chicken wire pattern. The end product is a relatively thick, inflexible fabric that will not stretch due to the limitation placed on it by the face cloth. The quilted thermal barrier is the innermost layer of the firefighter's garment and the face cloth may be next to the firefighter's skin if he or she is not wearing a station uniform or is wearing a station uniform with short sleeves.

The combination of the batting and the face cloth commonly is called the thermal barrier lining and it typically attaches to the inside of the garment by snaps so that it is removable to be easily washed or otherwise cleaned. Often times the lining also attaches to the garment by means of areas of hook-and-loop fasteners such as that sold under the trademark VELCRO®. The garment itself often is sealed by means of hook-and-loop fasteners rather than, for example, a zipper.

A problem with many linings currently sold and used is that the face cloth of the lining is rough and when the firefighter dons the jacket or pants the firefighter's street clothes or station uniform bunch up under the firefighter's garment. A face cloth having a smooth, slick surface can prevent this from happening because the cloth will slide over the station uniform and not cause it to bunch up. A rough face cloth also creates friction with the station uniform underneath it, making it even more difficult for the firefighter to move inside his or her gear. This increased exertion could lead to heat stress more quickly and severely.

One currently available face cloth is made from a fabric of all spun yarns of 100% poly(m-phenyleneisophthalamide). The yarns are woven into a fabric having a "pajama check" pattern. An aqueous finish is applied to the fabric which renders the fabric wickable. This finish includes an ethoxylated ester, a binder, and an inorganic salt catalyst and is applied by a pad-nip-tenter system. This face cloth has a rough texture and often leads to the station uniform bunching up under the garment. However, this is one of the least costly types of face cloth.

Another fabric currently used as a face cloth is also 100% poly(m-phenyleneisophthalamide) but it is a twill weave of spun warp yarns and filament filling yarns. The twill weave results in more filament yarns than spun yarns on one surface of the face cloth. Filament yarns are smoother than spun yarns and so this face cloth has one surface that is substantially slicker and smoother than the all spun yarn cloth described above. However, this spun/filament cloth has the problem that it is easily "picked" by the j-hooks of the hook-and-loop fasteners and by other relatively sharp items. The face cloth will become frayed and begin to present an unaesthetic appearance.

Still another type of face cloth currently on the market is made from 100% poly(m-phenyleneisophthalamide) and is a plain weave of all filament yarns. This fabric made of all filament yarns has the problem that the warp and filling yarns are slick and slide against one another. Thus, locations where the warp and filling yarns intersect are not particularly stable. This instability is passed on to the seam structures which easily deform when stressed. Also the fabric has a propensity to ravel at cut edges, a propensity which is aggravated during the cutting and sewing operations required to render the fabric into a useful face cloth. To solve this problem, all filament fabric requires a backcoating, usually a polyurethane, that imparts stability to the fabric by binding the yarns to one another. A side effect of the backcoating is that the fabric is made water repellent. This is a disadvantage for a face cloth because any moisture deposited on the face cloth from sweat, for example, remains on the surface of the cloth facing the firefighter and is not wicked into the interior of the face cloth. This can result in discomfort and, perhaps, scalding of the firefighter's skin. This face cloth does not, however, have the problem of being "picked" by hook-and-loop fasteners, probably because of the backcoating.

Spun yarns are manufactured from fibers having a fairly short length, about one (1) to one and one-half (1½) inches. The fibers are spun and twisted tightly together into a yarn. Filament yarns are made from extruded filaments. A filament yarn can be only one filament but typically has multiple filaments gently twisted into a multifilament yarn. Some filament yarns have a slight twist but not as much as spun yarns. Filament yarns are smoother than spun yarns and have a disadvantage in that they will not readily accept a finish or binder applied to a fabric made therefrom. It is believed that finish chemicals do not actually penetrate the filaments but rather reside between individual filaments. Spun yarns have a greater surface area and more interstices creating more places for finish to reside.

It is apparent from the above discussion that there is a need for a face cloth which combines a slick and smooth surface with hook-and-loop fastener compatibility and moisture wickability.

SUMMARY OF THE INVENTION

The present invention includes a face cloth for a thermal barrier lining of a firefighter's garment made from a fire resistant fabric of, preferably, 100% poly(m-phenyleneisophthalamide) yarns with, preferably, filament yarns in the filling direction and spun yarns in the warp direction. The yarns are woven into a twill pattern and a finish is applied to the fabric. The finish is similar to that previously used with the all spun yarn, pajama check face cloth. Surprisingly, the finish is accepted by the face side of the fabric of the present invention even though the face side of the fabric comprises mostly filament yarns. The finish renders the face cloth both wickable and hook-and-loop compatible.

The face cloth is an improvement over a face cloth made from an all filament yarn fabric because it is not water repellent and it is less costly. The face cloth is an improvement over a face cloth made from an all spun yarn fabric because it has a smooth and slick surface and can be easily donned by the wearer without the station uniform bunching up. The face cloth is an improvement over the prior art combination filament yarn and spun yarn face cloth because it is wickable. The face cloth also is hook-and-loop fastener compatible so it is not picked by the hooks.

The invention includes also a lining for a firefighter's garment and an improved firefighter's garment made with a face cloth according to the present invention.

It was discovered during use of the prior art combination filament yarn/spun yarn face cloth described above that the surface of the cloth was "picked" when it contacted the j-hooks of hook-and-loop fasteners. It was further discovered that this "picking" was attributable for the most part to the filament yarns and it was theorized that this is because the multiple filaments of the filament yarns do not stay down securely on the yarn surface. During manufacture of a filament yarn, the multiple filaments are bundled and only slightly twisted together so that the filaments are not held together or held down tightly. In addition, the filaments are subject to static buildup because they do not have very high moisture content. The static buildup causes the individual filaments to rise off the yarn and the fabric, rendering them vulnerable to being "picked" by the j-hooks of the hook-and-loop fasteners.

This problem of filament fibers being "picked" is solved by treating the fabric with a finish. The finish acts to bind the fibers. The bound fibers are held close to the surface and are therefore inaccessible to the j-hooks of the fasteners.

Surprisingly, the same finish used in the past to render a fabric made from all-spun yarn wickable functions to make the filament yarn/spun yarn fabric hook-and-loop compatible. The application of the finish to the fabric has another advantage in that it renders the fabric wickable due to its action on the spun yarns. The spun yarns enhance the take-up of finish rendering the fabric more wickable.

DETAILED DESCRIPTION OF A PREFERRED EMBODIMENT

Figure 1:
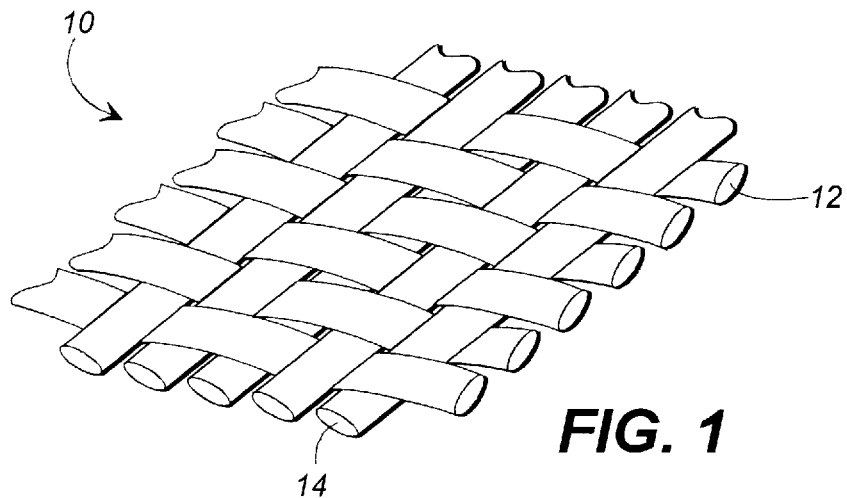
FIG. 1 illustrates the 2×1 twill weave of one embodiment of the face cloth of the present invention.

A face cloth 10 of the present invention is made from a fabric woven from filament yarns 12 and spun yarns 14. In particular, the fabric is preferably a 2×1 left hand twill weave as shown in FIG. 1, with filament yarns 12 extending in the filling direction and spun yarns 14 extending in the warp direction. The face side of the fabric is shown in FIG. 1. Of course, the fabric could have filament yarns in the warp direction and spun yarns in the filling direction. Also, the yarns could be woven into a variety of twill patterns or into a satin or sateen weave. The important aspect of the weave is that more filament yarns than spun yarns are exposed on one side of the fabric, which is used as the face side.

The filament yarns are preferably made of 100% poly(m-phenyleneisophthalamide) (NOMEX®) but may be made of another flame resistant material such as, for example, other aramids, flame resistant polynosic rayon, flame resistant cotton, flame resistant polyester, polybenzimidazole, polyvinyl alcohol, polytetrafluoroethylene, flame resistant wool, poly(vinyl chloride), polyetheretherketone, polyetherimide, polyethersulfone, polychal, polyimide, aliphatic polyamide, polyimide-amide, flame resistant polyolefin, polybenzoxazole, flame resistant acetone, carbon, modocrylic, melamine, glass, and mixtures thereof.

The filament yarns for the prepared embodiment are 200/100 denier (100 2-denier filaments) with about 59±1 picks per inch. It is expected that the filament yarn size could range between 50 and 400 denier which would result in about 40 to 70 picks per inch. The spun yarns are preferably made of 100% poly(m-phenyleneisophthalamide) 30/2 fibers having a length ranging from about 1–1.5 inches and having about 49±1 ends per inch. The spun yarn could be made of the same materials as set forth above for the filament yarn. The spun yarns could range between 20/2 to 50/2, have staple fiber lengths from about 1.0 to 2.5 inches, and have from about 40 to 100 ends per inch.

The fabric preferably includes approximately 50% filament yarns and 50% spun yarns, but would most likely have adequate performance characteristics with from about 30 to 70% filament yarns, with the balance spun yarns.

The fabric prepared as above has a weight of 4.1 ounce per square yard ($oz/yd^2$). Preferably the fabric has a weight from about 2.5 $oz/yd^2$ to 5.0 $oz/yd^2$. A heavier fabric would be more costly with no added benefit and a lighter weight fabric would have poor durability and too open a weave.

By virtue of use of the twill weave more of the filament yarns than spun yarns are on the outer or face side 16 of the fabric, that is on the surface that is towards the firefighter when the fabric is made into a face cloth of a lining. Thus, the cloth is smooth and slick on the surface facing the firefighter and the problem of the station uniform bunching up underneath the garment and generating friction with the garment is overcome. This fabric, furthermore, is not as unstable as an untreated 100% filament fabric or water repellent as is a backcoated 100% filament fabric. The fabric prepared according to the above may be dyed before finishing by methods known in the art.

An aqueous finish composition is applied to the fabric that includes up to 10% ethoxylated ester, up to 10% melamine, and an inorganic salt catalyst. The finish is applied by padding on the finish solution using a pad-nip-tenter system at about 350–400° F. In other words, the finish is padded onto the fabric, and a nipping action removes excess solution from the fabric. The fabric is then passed through a tenter which heats the fabric at a temperature ranging from about 350–400° F. so as to dry and cure the finish.

The ethoxylated ester acts as a wicking agent. The resin functions as a binder and improves the durability of the wicking agent and imparts a surface characteristic to minimize picking. Other possible wicking agents include soil release chemicals, non-ionic based surfactants and sulfonated wetting agents. Other chemicals that could be used to provide durability and binding characteristics include dimethyldihydroxyethyleneurea (DMDHEU), modified DMDHEU, polyethylene based softeners, and non-formaldehyde based binders.

Figure 2:
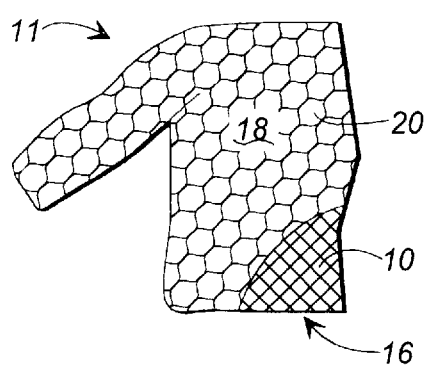
FIG. 2 is a partial cut-away view of the thermal barrier lining of the present invention.

To form a thermal barrier lining 11, shown in FIG. 2, the dyed and finished face cloth 10 is quilted to a batting 18 made from flame resistant fibers. Preferably, the batting used for the present lining 11 is one of two types. A single layer of an aramid needle-punch fabric can be used. Alternatively, a batting made of layers of spun-lace aramid fabric can be used. The batting can also be made of other types of flame resistant materials. The quilting can be any type that will hold the batting stable underneath the face cloth, such as "chicken wire" quilting 20 as shown in FIG. 2. The quilted fabric is then cut and sewn into a thermal barrier lining 11. In some cases the moisture barrier 38 may be stitched to the lining around the edges of both. For example, a piping may be applied around the edges of the moisture barrier and the lining.

Figure 3:
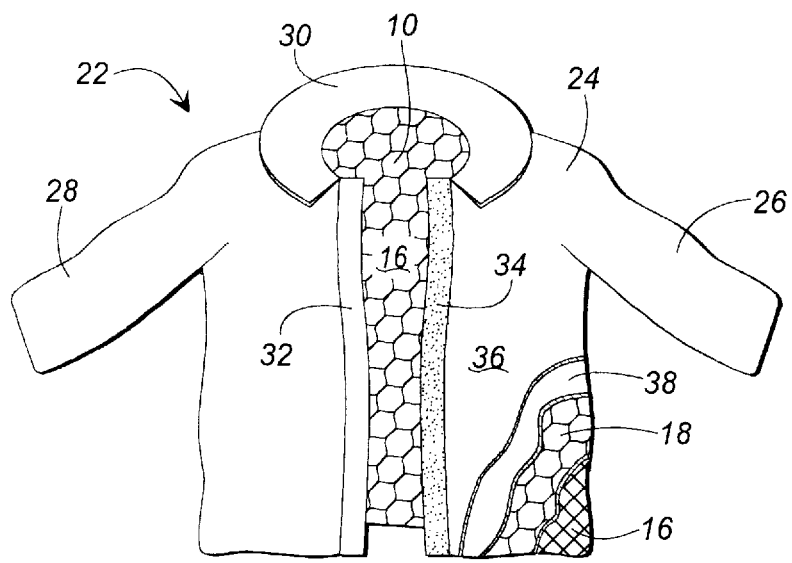
FIG. 3 is a partial cut-away view of a firefighter's garment with the thermal barrier lining in place.
Figure 1:
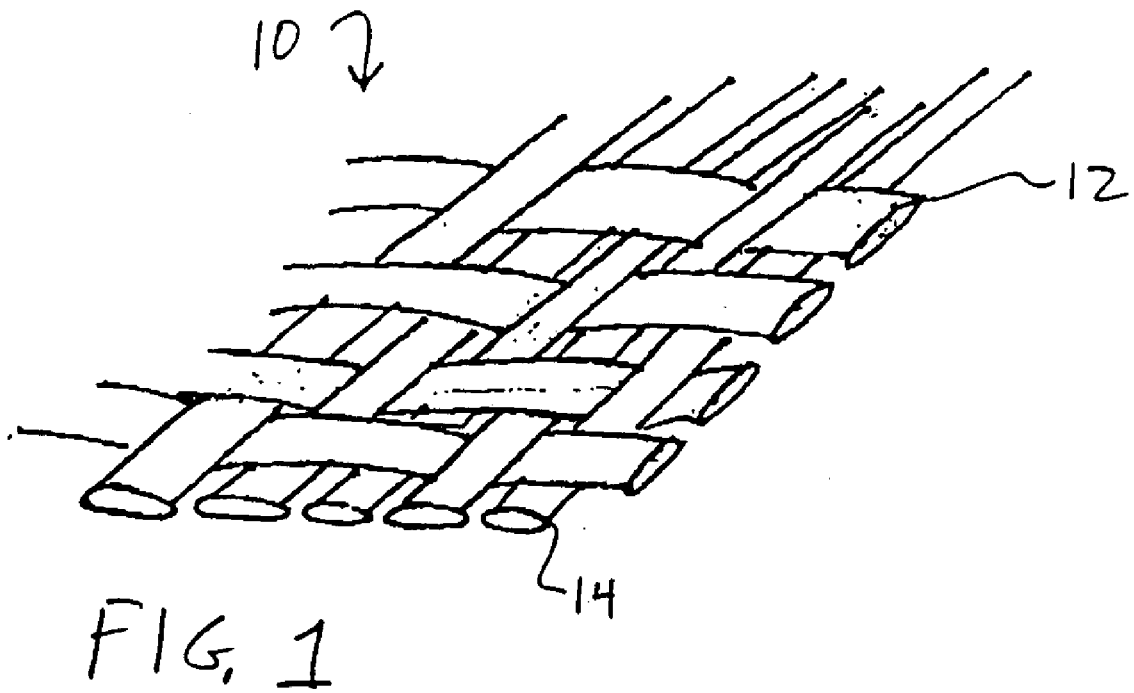

A firefighter's garment 22, shown in FIG. 3, can be fashioned incorporating the lining 11 of the present invention. The garment is shown as a jacket but it could also be pants, etc. The garment includes a body portion 24, sleeves 26, 28 and collar 30. The body portion includes a front closure including a flap 32 and strip 34. The hooks of hook-and-loop fasteners are attached to the underside of the flap and the loops of the hook-and-loop fasteners are attached to the outer surface of the strip 34.

The outer layer of garment 22 is shell 36 which is of a type which is standard in the art. A moisture barrier 38 is incorporated between the shell and the thermal barrier 11. The moisture barrier also is of a type which is standard in the art.

Figure 4:
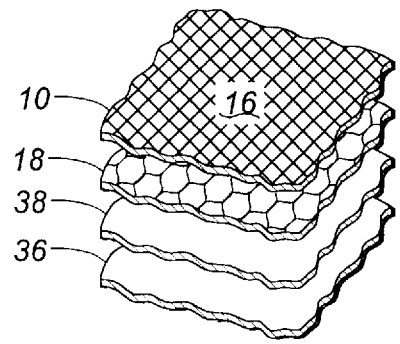
FIG. 4 is an exploded view showing the layers of the garment shown in FIG. 3.

FIG. 4 illustrates the layers of the garment. The face cloth 10 is quilted to the batting 18 to form the lining. The lining 11 is then attached to the shell 36 and the moisture barrier 38 is sandwiched therebetween.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

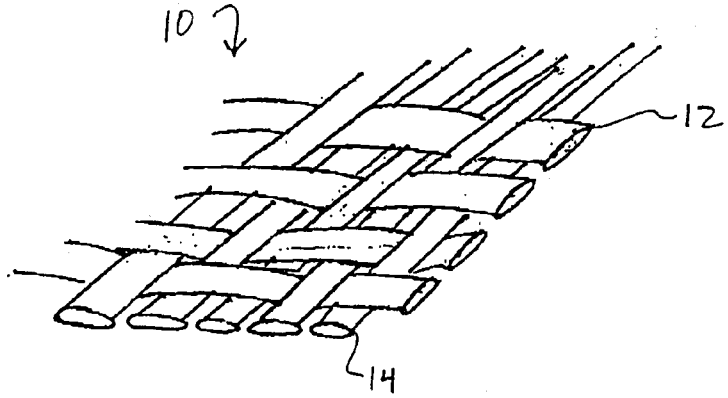

What is claimed is:

1. A fabric suitable for use as a face cloth of a thermal barrier in a firefighter's turn-out garment, having a face side that faces the firefighter, comprising:

a plurality of filament yarns and a plurality of spun yarns, woven such that more filament yarns than spun yarns are on the face side of the weave; and a finish applied to the fabric which renders the face side of the fabric wickable and resistant to picking.

2. The fabric of claim 1, wherein said filament yarns and said spun yarns are woven into a twill pattern, a satin weave or a sateen weave.

3. The fabric of claim 1, wherein said filament yarns and said spun yarns are woven into a 2×1 left hand twill weave, with said filament yarns in the filling direction and said spun yarns in the warp direction.

4. The fabric of claim 1, wherein said filament yarns comprise a flame resistant material.

5. The fabric of claim 1, wherein said filament yarns are made of a flame resistant material selected from the group consisting of aramids, flame resistant polynosic rayon, flame resistant cotton, flame resistant polyester, polybenzimidazole, polyvinyl alcohol, polytetrafluoroethylene, flame resistant wool, poly(vinyl chloride), polyetheretherketone, polyetherimide, polyethersulfone, polychal, polyimide, aliphatic polyamide, polyimide-amide, flame resistant polyolefin, polybenzoxazole, flame resistant acetone, carbon, modocrylic, melamine, glass and mixtures thereof.

6. The fabric of claim 1, wherein said filament yarns comprise poly(m-phenyleneisophthalamide).

7. The fabric of claim 1, wherein said filament yarn size ranges between 50 and 400 denier resulting in about 40 to 70 picks per inch.

8. The fabric of claim 1, wherein said filament yarns are 200/100 denier with about 59±1 picks per inch.

9. The fabric of claim 1, wherein said spun yarns comprise a flame resistant material.

10. The fabric of claim 1, wherein said spun yarns are made of a flame resistant material selected from the group consisting of aramids, flame resistant polynosic rayon, flame resistant cotton, flame resistant polyester, polybenzimidazole, polyvinyl alcohol, polytetrafluoroethylene, flame resistant wool, poly(vinyl chloride), polyetheretherketone, polyetherimide, polyethersulfone, polychal, polyimide, aliphatic polyamide, polyimide-amide, flame resistant polyolefin, polybenzoxazole, flame resistant acetone, carbon, modocrylic, melamine, glass and mixtures thereof.

11. The fabric of claim 1, wherein said spun yarns comprise poly(m-phenyleneisophthalamide).

12. The fabric of claim 1, wherein said spun yarns range from about 20/2 to 50/2 cotton count, have staple fiber lengths from about 1.0 to 2.5 inches, and have from about 40 to 100 ends per inch.

13. The fabric of claim 1, wherein said spun yarns are 30/2 cotton count made from fibers having a length ranging from about 1 to 1.5 inches and can be woven into a fabric having 49±1 ends per inch.

14. The fabric of claim 1, comprising from about 30 to 70% filament yarns, with the balance spun yarns.

15. The fabric of claim 1, comprising about 50% filament yarns and 50% spun yarns.

16. The fabric of claim 1, wherein said finish comprises a solution comprising up to 10% ethoxylated ester, up to 10% melamine, and an inorganic salt catalyst.

17. The fabric of claim 16, wherein said fabric is characterized by having said finish applied by padding on said finish solution using a pad-nip-tenter system at about 350–400° F.

18. A thermal barrier in a firefighter's turnout garment, comprising a face cloth made of the fabric of claim 1 fastened to a flame resistant batting.

19. A layered firefighter's turnout garment, comprising:

an outer layer comprising a shell made of flame resistant fibers;

an intermediate layer formed of moisture barrier material; and a thermal barrier made of a face cloth of the fabric of claim 1 quilted to a batting made from flame resistant fibers.

20. A layered firefighter's turnout garment, comprising:

an outer layer comprising a shell made of flame resistant fibers;

an intermediate layer formed of moisture barrier material; and a thermal barrier made of a face cloth quilted to a batting, wherein said face cloth is made from a fabric that is a 2×1 left hand twill weave, with filament yarns in the filling direction and spun yarns in the warp direction, said filament yarns being 200/100 denier poly(m-phenyleneisophthalamide), said spun yarns being 30/2 denier poly(m-phenyleneisophthalamide) fibers having a length ranging from about 1 to 1.5 inches, and said fabric comprising about 50% filament yarns and about 50% spun yarns, and wherein a finish is applied to said fabric, said finish comprising a solution comprising up to 10% ethoxylated ester, up to 10% melamine, and an inorganic salt catalyst.

21. A method of making a fabric suitable for use as a face cloth of a barrier in a firefighter's turnout garment, having a face side and a back side, comprising the steps of:

forming a weave of a plurality of filament yarns and a plurality of spun yarns wherein more filament yarns than spun yarns are on the face side of the weave; and applying a finish to the fabric which renders the face side of the fabric wickable and resistant to picking.

22. The method of claim 21, wherein said weave is a 2×1 . left hand twill weave, with said filament yarns in the filling direction and said spun yarns in the warp direction, said filament yarns are 200/100 denier poly (m-phenyleneisophthalamide), said spun yarns being 30/2 denier cotton count poly (m-phenyleneisophthalamide) fibers having a length ranging from about 1 to 1.5 inches, and said fabric comprises about 50% filament yarns and about 50% spun yarns, and wherein said finish comprises a solution comprising up to 10% ethoxylated ester, up to 10% melamine, and an inorganic salt catalyst.

* * * * *

UNITED STATES PATENT AND TRADEMARK OFFICE
CERTIFICATE OF CORRECTION

PATENT NO.    : 5,928,971
DATED         : July 27, 1999
INVENTOR(S)   : Ellis et al.

It is certified that error appears in the above-identified patent and that said Letters Patent is hereby corrected as shown below:

Title page, showing an Illustrative figure, should be deleted and substitute therefore the attached title page.

<u>Drawings,</u>
Fig 1. on sheet 1 of 1, delete and substitute therefore Fig. 1 as shown on the attached page.

Signed and Sealed this

Fifth Day of August, 2003

JAMES E. ROGAN
*Director of the United States Patent and Trademark Office*

United States Patent [19]

Ellis et al.

[11] Patent Number: 5,928,971
[45] Date of Patent: Jul. 27, 1999

[54] FIREFIGHTER'S GARMENT

[75] Inventors: W. Douglas Ellis, Atlanta; Denise N. Statham, Sharpsburg; Gregory Alexander, Senoia, all of Ga.

[73] Assignee: Southern Mills, Inc., Union City, Ga.

[21] Appl. No.: 08/792,294

[22] Filed: Jan. 31, 1997

Related U.S. Application Data

[60] Provisional application No. 60/011,017, Feb. 1, 1996.

[51] Int. Cl.$^6$ ....................................... B32B 7/00
[52] U.S. Cl. .................... 442/76; 442/118; 442/208; 442/209; 442/240; 442/244
[58] Field of Search ...................... 442/76, 118, 136, 442/208, 209, 240, 244

[56] References Cited

U.S. PATENT DOCUMENTS

| 3,710,395 | 1/1973 | Spano et al. | 2/78 |
|---|---|---|---|
| 4,034,417 | 7/1977 | Ellis | 2/81 |
| 4,039,709 | 8/1977 | Newman | 428/159 |
| 4,451,934 | 6/1984 | Gioello | 2/113 |
| 4,502,153 | 3/1985 | Lapedes et al. | 2/81 |
| 4,604,759 | 8/1986 | Bowman et al. | 2/81 |
| 4,709,421 | 12/1987 | Grilliot et al. | 2/81 |
| 4,748,691 | 6/1988 | Grilliot et al. | 2/81 |
| 4,830,897 | 5/1989 | Lichtenstein | 428/90 |
| 4,843,646 | 7/1989 | Grilliot et al. | 2/69 |
| 4,897,886 | 2/1990 | Grilliot et al. | 2/81 |
| 5,001,781 | 3/1991 | Grilliot et al. | 2/69 |
| 5,001,783 | 3/1991 | Grilliot et al. | 2/81 |
| 5,031,242 | 7/1991 | Aldridge et al. | 2/81 |
| 5,131,097 | 7/1992 | Grilliot et al. | 2/81 |
| 5,150,476 | 9/1992 | Statham et al. | 2/93 |
| 5,236,769 | 8/1993 | Paire | 428/196 |
| 5,362,555 | 11/1994 | Lai | 442/118 |
| 5,539,928 | 7/1996 | Aldridge | 2/93 |

*Primary Examiner*—James J. Bell
*Attorney, Agent, or Firm*—Thomas, Kayden, Horstemeyer & Risley

[57] ABSTRACT

A face cloth for a thermal barrier of a firefighter's garment made from a fabric woven from fire resistant yarns. The yarns are woven into a twill pattern with, preferably, filament yarns in the filling direction and spun yarns in the warp direction and a finish is applied to the fabric. The finish is accepted by the fabric and renders the face cloth both wickable and hook-and-loop compatible. The face cloth has a smooth and slick surface and is wickable and hook-and-loop fastener compatible.

22 Claims, 1 Drawing Sheet